United States Patent [19]

Aoshima et al.

[11] Patent Number: 4,943,938
[45] Date of Patent: Jul. 24, 1990

[54] SYSTEM FOR DISPLAYING SHADED IMAGE OF THREE-DIMENSIONAL OBJECT

[75] Inventors: Toshihisa Aoshima, Tokyo; Seiichi Kanema, Yokohama; Takeshi Kato, Hitachi, all of Japan

[73] Assignee: Hitachi, Ltd., Tokyo, Japan

[21] Appl. No.: 918,335

[22] Filed: Oct. 14, 1986

[30] Foreign Application Priority Data

Oct. 11, 1985 [JP] Japan ................................. 60-224716

[51] Int. Cl.$^5$ .............................................. G06F 15/72
[52] U.S. Cl. ..................................... 364/522; 340/729
[58] Field of Search ................ 364/522; 340/728, 729, 340/747, 793

[56] References Cited

U.S. PATENT DOCUMENTS

| | | | |
|---|---|---|---|
| 3,441,789 | 4/1969 | Harrison, III | 364/522 X |
| 3,539,860 | 11/1970 | Max et al. | 340/729 X |
| 4,352,105 | 9/1982 | Harney | 340/747 X |
| 4,609,917 | 9/1986 | Shen | 364/522 X |
| 4,679,041 | 7/1987 | Fetter et al. | 340/729 X |
| 4,709,231 | 11/1987 | Sakaibara et al. | 364/522 X |

OTHER PUBLICATIONS

J. D. Foly and A. Van Dam, "Fundamentals of Interactive Computer Graphics", Addison Wesely Publishing Company.

Primary Examiner—Gary V. Harkcom
Assistant Examiner—Mark K. Zimmerman
Attorney, Agent, or Firm—Antonelli, Terry, Stout & Kraus

[57] ABSTRACT

A display system comprising: display apparatus; a first apparatus for producing a depth value signal and a normal direction signal for each of those display pixels, included in a two-dimensional graphic obtained when a three-dimensional graphic to be displayed is projected on a two-dimensional plane, among the pixels constituting a display screen on the display device, a second apparatus connected to the first apparatus and responsive to each of the depth value signals for producing a first reflection light intensity signal for each display pixel, a third apparatus connected with the first apparatus and responsive to each of the normal direction signals produced from the first apparatus for producing a second reflection light intensity signal for each display pixel, and a fourth apparatus, connected to the display device, the second apparatus and third apparatus and responsive to the first and second reflection light intensity signals for each display pixel for controlling a reflection light intensity signal for each of the plurality of display pixels to be sent to said display device.

4 Claims, 3 Drawing Sheets

SYSTEM FOR DISPLAYING SHADED IMAGE OF THREE-DIMENSIONAL OBJECT

BACKGROUND OF THE INVENTION

This invention relates to a display system for a three-dimensional graphic in which shading is made and more particularly to a display system having a reflection light intensity control device that is suitable to display a shaded object on the basis of the reflection model of light.

It is well known to vary the reflection light intensity or shade at each of the points of a displayed graphic in order to display a three-dimensional graphic on a two-dimensional display device so that the displayed graphic has a three-dimensional effect. One of the model equations for computing the reflection light intensity is disclosed in the reference "Fundamentals of Interactive Computer Graphics" Addison Wesely Publishing Company, 1982, pp. 575–578. As seen from this reference, the intensity (reflection light intensity) of reflection light that reaches the viewpoint from a certain point (reflecting point) of a certain surface (reflection surface) is written as:

$$I = I_a K_a + \frac{I_p}{r + k} \{K_d(N \cdot L) + K_s(R \cdot V)^n\} \quad (1)$$

where
$I_a$: intensity of ambient light at a reflecting point
$I_p$: intensity of a point light source
$n$: specular reflection factor
$\vec{N}$: normalized normal vector to a reflection surface
$\vec{L}$: normalized vector to the point light source
$\vec{R}$: normalized vector in the direction of specular reflection
$\vec{V}$: normalized vector in the direction of the viewpoint
$r$: distance from the reflecting point to the viewpoint (depth)
$K_a$: ambient-light-reflection coefficient
$K_d$: diffuse-reflection coefficient
$K_s$: specular-reflection coefficient
$k$: constant FIG. 2 illustrate several vectors included in Equation (1).

The values of the variables other than $K_a$, $K_d$, $K_s$ and $k$ vary depending upon the positions of the individual points on the reflection surface. Each of $K_a$, $K_d$, $K_s$, $I_a$ and $I_p$ can be separated into a red component (R), green component (G) and blue component (B) and Equation (1) is valid for each color component, which is also true of the Equations offered hereinbelow. $K_a$, $K_d$, $K_s$, and $n$ depend on the material of the reflecting surface but do not depend on the position of the individual reflecting point on the reflection surface. Since the dot product $(\vec{R} \cdot \vec{V})$ at the third term in Equation (1) can be replaced by the dot product $(\vec{N} \cdot \vec{H})$ of $\vec{N}$ and the normalized vectors $\vec{H}$ in the middle direction between the light source and the viewpoint (i.e. the direction of the sum of $\vec{L}$ and $\vec{V}$) Equation (1) can be transformed into $$I = I_a K_a + \frac{I_p}{r + k} \{K_d(N \cdot L) + K_s(N \cdot H)^n\} \quad (2)$$

Further, Equation (2) can be regarded as a sum of the following two terms:

$$I'_{ad} = I_a K_a + \frac{I_p}{r + k} \times K_d(N \cdot L) \quad (3)$$

$$I_s' = \frac{I_p}{r + k} \times K_s(N \cdot H)^n \quad (4)$$

In Equation (3), $I_a K_a$ is a reflecting light component by the ambient light, and the remainder is a diffuse reflecting light component by the light from the light source. Thus, $I'_{ad}$ represents the diffuse reflecting light component as a whole. On the other hand, $I_s'$ in Equation (4) is a specular reflecting light component. Further, it will be understood that both those two components are functions of a depth $r$ (distance between the viewpoint and the reflecting point) and a normalized normal vector $\vec{N}$ to the reflection surface.

In the display device for two-dimensionally displaying a three-dimensional graphic, it is necessary to compute the reflection light intensity $I$ of each of the points (reflecting points) on the three dimensional graphic, corresponding to each of the pixels on the two-dimensional graphic. If Equation (2) is used for this purpose, however, the computing is very time-consuming since Equation (2) includes several multiplications and divisions. In the technique disclosed on pages 543 and 544 of the above reference, the reflection light intensity I. varied at each point is displayed using only the depth $r$. In this technique, however, some graphics cannot be displayed with a sufficient three-dimensional effect since different surfaces having the same depth $r$ carry the same reflection light intensity. Further, in the graphic shading device disclosed in Japanese Patent Application No. 59-223922 that was filed before this application and was laid open after the Conventional priority date of this application, it was proposed to compute the reflection light intensity I at each reflecting point, assuming that the depth $r$ in Equation (2) is constant, by the following equation $$I = I_a K_a + \frac{I_p}{C} \{K_d(N \cdot L) + K_s(N \cdot H)^n\} \quad (5)$$

where C is constant.

If the reflection light intensity varied at each point is indicated by the reflection light intensity only in the direction of the reflection surface, graphics are displayed with the same reflection light intensity, when a plurality of graphics to be displayed are in the same direction or form the same angle with the direction of the light source or viewpoint, and it becomes impossible to recognize boundaries of graphics and it may provide spoiled three-dimensional effect, if they are contiguous to each other.

Further, in accordance with the use of the display device, it is desired that the reflection light intensity variation be exaggerated depending upon the difference or it is exaggerated depending upon the difference of the direction of the normal line. The prior art, however, can not implement this.

SUMMARY OF THE INVENTION

An object of this invention is to provide a display device which can vary the reflection light intensity I of each of the points (reflecting points) of the three dimensional graphic displayed at the display pixel positions, depending upon both the normal direction at the reflecting point on the surface to which it belongs (hereinafter referred to as the direction of a display pixel) and the depth at the reflecting point (hereinafter referred to as the depth of a display pixel) and which can determine the reflection light intensity at a high speed. Another object of this invention is to provide a display device which can appropriately vary the ratio of the reflection light intensity variation depending on the depth r of the display pixel and depending on the direction $\vec{N}$ of the display pixel.

In this invention, Equation (2) it transformed into:

$$I = I_r + I_N \tag{6}$$

where $$I_r = \frac{K_1 I_p(C_1 K_d + C_2 K_s)}{r + k} \tag{7}$$

$$I_N = K_2 \left( I_a K_a + \frac{I_p(K_d(N \cdot L) + K_s(N \cdot H)^n)}{C_4} \right) \tag{8}$$

Equation (7) is obtained by approximating the two dot products $(\vec{N} \cdot \vec{L})$ and $(\vec{N} \cdot \vec{H})$ in Equation (2), using constants $C_1$, and $C_2$, respectively. In Equation (7), $K_1$, $K_d$ and $K_s$ are predetermined by the material of the reflection surface of the graphic to be displayed. Therefore, the component $I_r$ is varied only by the depth r for a plurality of display pixels in the same surface. On the other hand, Equation (8) is obtained by regarding the depth r in Equation (2) as constant $C_4$. $K_a$ and $K_s$ are predetermined by the material of the reflection surface of the graphic to be displayed. Therefore, Equation (8) depends upon two dot products $(\vec{N} \cdot \vec{L})$ and $(N \cdot H)$, with the material of the reflection surface of the graphic decided. In Equations (7) and (8), $K_1$ and $K_2$ serve to decide the relative ratio of $I_r$ to $I_N$. The reflection light intensity calculated from Equation (6) is different from that calculated from Equation (2). In an actual graphic display device, the strict value of the reflection light intensity I is not important but it is important how the reflection light intensity I is varied with the depth r of the display pixel, the direction N thereof, and the material of the reflection surface. Equations (6) and (2) essentially have the same relation for these variables so that the graphic displayed with the reflection light intensity obtained from Equation (6) provides a distribution of the reflection light intensity in the image which distribution is not unnatural. Moreover, $I_r$ and $I_N$ can be easily calculated since they are dependent upon either one of r and $\vec{N}$. Further, by appropriately deciding the ratio of $K_1$ to $K_2$ in equations (7) and (8), the ratio of the reflection light intensity component $I_r$, depending on the depth r, to the reflection light intensity component $I_N$, depending on the direction $\vec{N}$ of the display pixel, can be varied so that the calculation by Equation (6) is more useful in some uses of the display device.

To attain the object of this invention, in accordance with this invention, there is provided a display system comprising: display means; first means for producing a depth value signal and a normal direction signal for each of these display pixels, which are included in a two-dimensional graphic obtained when a three-dimensional graphic to be displayed is projected on a two-dimensional plane, among a plurality of pixels constituting a display screen on the display means, the depth value signal indicating a distance between a predetermined hypothetical viewing point that is a position for viewing the three-dimensional graphic and the point on the three-dimensional graphic corresponding to the position of each pixel, the normal direction signal indicating a normal direction to a surface of the three-dimensional graphic at the corresponding point of each display pixel; second means connected with the first means and responsive to each of the depth value signals produced by the first means, for producing a first reflection light intensity signal, for each display pixel, indicating reflection light intensity depending upon the depth value signal for each display pixel of the entire reflection light intensity at the corresponding point when viewed from the hypothetical viewing point in a state where the three-dimensional graphic is illuminated by a hypothetical light source, third means connected to the first means and responsive to each of the normal direction signals produced by the first means for producing a second reflection light intensity signal for each display pixel, indicating a reflection light intensity depending upon the normal direction of the entire reflection light intensity at the corresponding point of each display pixel, and fourth means, connected to the display means, second means and third means and responsive to the first and second reflection light intensity signals for each display pixel produced by the second and third means, for controlling a reflection light intensity signal for each of the plurality of pixel to be sent to the display means.

BRIEF DESCRIPTION OF THE DRAWINGS

The above and other objects, features and advantages of this invention will be more clearly understood from the following detailed description taken in conjunction with the accompanying drawings.

DESCRIPTION OF THE PREFERRED EMBODIMENTS

Figure 1:
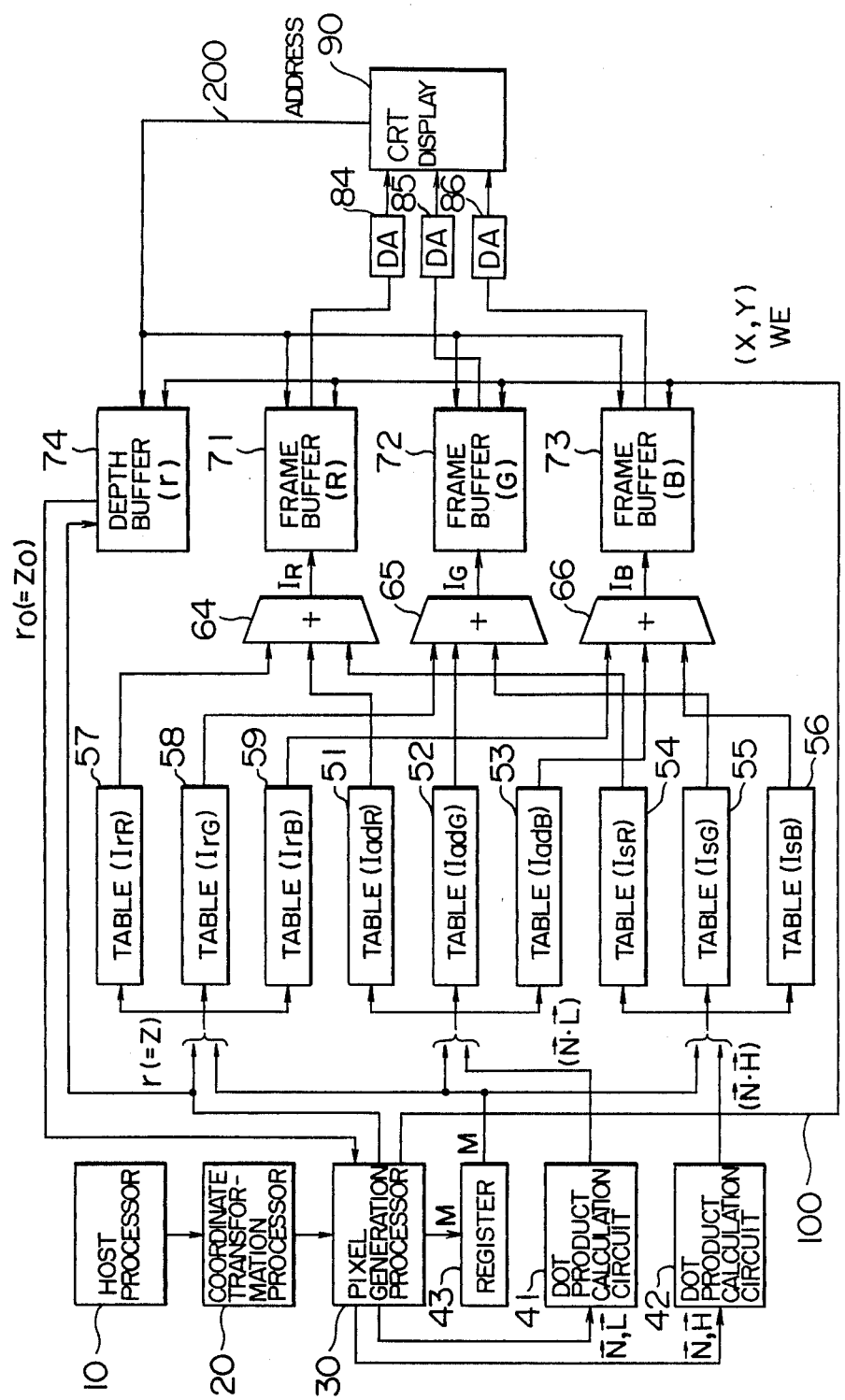
FIG. 1 is a block diagram of a display system according to a first embodiment of this invention.

Referring now to FIG. 1 showing an entire system of a first embodiment according to this invention, a coordinate transformation processor 20 receives from a host processor 10 display data of each of a plurality of graphics to be simultaneously displayed and position data of a viewpoint so as to perform the coordinate transformation including the visual transformation, the transformation for expansion and reduction, etc. The display data comprises the three dimensional polyline data or three-dimensional polygon data having the coordinate values and the normalized normal vector at each of the vertexes of each graphic and the material number of each graphic. The coordinate value after the visual transformation by the coordinate transformation processor 20 consists of x- and y-coordinate values which are projected on a screen on which a three-dimensional graphic is projected and a z-coordinate value which is a distance from the viewpoint to the graphic in the direction normal to the screen. Generally, the z-coordinate value can be approximated to the depth value r in Equation (7). A pixel generation processor 30 sequentially executes the following processings for each graphic. The material number M of the graphic being processed is set in a register 43. The positions of a plurality of display pixels necessary to display that graphic are determined from the display data after the above coordinate transformation. The coordinates (x, y, z) of each display pixel can be obtained from the coordinates of the respective vertexes of displayed graphics through interpolation. As mentioned above, the z-coordinate is used as the depth value r. A depth buffer 74 has an area for storing the depth values of the points of a certain graphic to be displayed on the screen for each display pixel thereon. Similarly, frame buffers 71 to 73 have areas for storing the red component (R) $I_R$, green component (G) $I_G$ and blue component (B) $I_B$ of the reflection light intensity I of each point of a certain graphic to be displayed on the screen for each display pixel thereon, respectively. The pixel generation processor 30 supplies the x- and y-coordinate to the depth buffer 74 and frame buffers 71 to 73 as the address of the storing area in each buffer corresponding to a contain display pixel. A storing area in each of the buffers 71 to 74 is provided corresponding to each display pixel on the screen. The address of the storing area corresponding to the pixel at coordinates (x, y) can be represented by a combination of x- and y-coordinates.

Now, the pixel generation processor 30 sends to the depth buffer 74 the depth value r (z-coordinate) produced for the display pixel now in processing, sends to a dot product calculation circuit 41 the normalized normal vector $\vec{N}$ to reflection surface and the normalized vector $\vec{L}$ in the direction of the light source, sends to a dot calculation circuit 42 the normalized normal vector $\vec{N}$ to reflection surface and a normalized vector $\vec{H}$ in the middle direction between the light source and the viewpoint, and sends to the depth buffer 74 and the frame buffer 71 to 73 the address of the display pixel now in processing and a write enable signal WE. Thus, the depth value r generated is written in the depth buffer 74, and the R, G and B components $I_R$, $I_G$ and $I_B$ of the reflection light intensity I, which will be calculated as described below, are written in the frame buffers 71 to 73.

The dot product calculation circuit 41 calculates, using the vectors $\vec{N}$ and $\vec{L}$ and mentioned above which are sent from the processor 30, the dot product $(\vec{N}\cdot\vec{L})$. The dot product calculation circuit 42 calculates, using the vectors $\vec{N}$ and $\vec{H}$ mentioned above which are sent from the processor 30, the dot product $(\vec{N}\cdot\vec{H})$. The outputs from the circuits 41 and 42 are combined, with the material number M from the register 43 to provide read addresses for reflection light intensity tables 51 to 56. The reflection light intensity components $I_{rR}$, $I_{rG}$ and $I_{rB}$, depending upon the depth r and the material of the surface of a graphic, are previously stored in reflection light intensity tables 57 to 59 for the R, G and B components, respectively. Namely, the R, G and B components of the reflection light intensity $I_r$ defined by Equation (7), i.e., $I_{rR}$, $I_{rG}$ and $I_{rB}$, are calculated, with the depth r varied, for a certain material. Then, this calculation is carried out with the material varied. The data thus obtained are sequentially stored, for the respective R, G and B components, in the memories selected, depending upon the material number M and the depth r, in the tables 57 to 59. Thus, when these reflection light intensity tables 57 to 59 are accessed by the address consisting of the material number M from the register 43 and the depth value r from the pixel production processor 30, the reflection light intensity components $I_{rR}$, $I_{rG}$ and $I_{rB}$ are sent from the reflection light intensity tables 57 to 59 to adders 64 to 66, respectively.

On the other hand, in the reflection light intensity tables 51 to 56 are previously stored the reflection light intensity components selected depending upon the direction $\vec{N}$ of a display pixel and the material of a reflection surface. Namely, $I_n$ in Equation (8) can be regarded as $$I_N = I_{ad} + I_s \qquad (9)$$

where $$I_{ad} = K_2\left(I_aK_a + \frac{I_pK_d(N\cdot L)}{C_4}\right) \qquad (10)$$

$$I_s = \frac{K_2I_pK_s(N\cdot H)^n}{C_4} \qquad (11)$$

The reflection light intensity $I_{ad}$ in Equation (10) consists of an ambient-light-reflection-light component and a diffuse-reflection light component, and the reflection light intensity $I_s$ consists of only a specular reflection light component. The R, G and B component of the reflection light intensity $I_{ad}$ defined by Equation (10), $I_{adR}$, $I_{adG}$ and $I_{adB}$ are calculated, with the dot product $(\vec{N}\cdot\vec{L})$ varied, for a certain material, and then the same calculation is carried out with the material varied. The data thus obtained are previously stored, for the respective R, G and B components, in the memories selected depending upon the material number M and the dot product $(\vec{N}\cdot\vec{L})$ in the tables 51 to 53. Also, the R, G and B components of the reflection light intensity $I_s$ defined by Equation (11) are previously stored, with the material and the dot product $(\vec{N}\cdot\vec{H})$ varied, in the corresponding memories in the tables 54 to 56. Thus, when the reflection light intensity tables 51 to 53 are accessed by the address consisting of the dot product $(\vec{N}\cdot\vec{L})$ from the dot calculation circuit 41 and the material number M from the register 43, the corresponding reflection light intensity components $I_{adR}$, $I_{adG}$ and $I_{adB}$ are sent to adders 64 to 66, respectively. Similarly, when the reflection light intensity tables 54 to 56 are accessed by the address consisting of the dot product $(\vec{N}\cdot\vec{H})$ from the dot calculation circuit 41 and the material number M from the register 43, the corresponding reflection light intensity components $I_{sR}$, $I_{sG}$ and $I_{sB}$ are sent to adders 64 to 66, respectively.

The adder 64 adds the R components of the reflection light intensity components $I_r$, $I_{ad}$ and $I_s$ calculated from Equations (7), (10) and (11), respectively, the adder 65 adds the G components thereof, and the adder 66 adds the B components thereof. Thus, the R, G and B component of the resultant reflection light intensity I, i.e., $I_R$, $I_G$ and $I_B$ are sent to frame buffers 71 to 73, respectively, which store the outputs $I_R$, $I_G$ and $I_B$ from the adders 64 to 66 in response to the address (x, y) and the write enable signal WE.

In this way, for one pixel, the reflection light intensity data are produced and written in the frame buffers 71 to 73. The same processing will be subsequently carried out for other pixels.

The contents of the frame buffers 71 to 73 are raster-scanned and converted into video signals by digital-toanalog converters 84, 85 and 86 so as to control the reflection light intensity in a CRT display 90.

Incidentally, the above writing of the data in the depth buffer 74 and the frame buffers 71 to 73 is not carried out if the data are for a so-called hidden surface. Namely, the pixel generation processor 30, before the depth value r is written in the depth buffer 74 at a certain position, reads out the depth value $r_o$ stored at that write position. This value $r_o$ is the depth for a certain point on the other graphic. The pixel production processor 30 does not send the write enable signal WE to the buffers 71 to 74 when that depth value $r_o$ is found to be smaller than the depth value r the pixel production processor 30 has produced. Thus, the pixel generation processor 30 does not carry out the rewriting for the depth buffer 74 and the frame buffers 71 to 73 as mentioned above. That the depth value $r_o$ read out from the depth buffer 74 is smaller than the depth value r which the pixel generation processor 30 has now generated means that another graphic exists before the graphic the pixel generation was intended to display. Therefore, in order not to display the latter graphic (or to erase the hidden surface), the contents of the buffers 74 and 71 to 73 are not changed for the pixel now being processed.

As apparent from the above explanation, in accordance with this embodiment, the data necessary to calculate the reflection light intensity I are previously stored in the reflection light intensity tables 51 to 59 so that the calculation of the reflection light intensity can be carried out at a high speed. Further, since the data in each reflection light intensity table depends upon only the material of a surface and one of the depth value r, the dot product ($\vec{N}\cdot\vec{L}$) and the dot product ($\vec{N}\cdot\vec{H}$), the required data amount is less than the case where the reflection light intensity is obtained depending upon all of the depth r and dot products ($\vec{N}\cdot\vec{K}$) and ($\vec{N}\cdot\vec{H}$), as in Equation (2). Moreover, the data stored in these tables 51 to 59 allow the relative ratio of the reflection light intensity $I_r$ depending upon the depth value r to the reflection light intensity $I_N$ depending upon the dot products ($\vec{N}\cdot\vec{L}$) and ($\vec{N}\cdot\vec{H}$) to be easily varied by appropriately deciding the coefficients $K_1$ and $K_2$.

Figure 3:
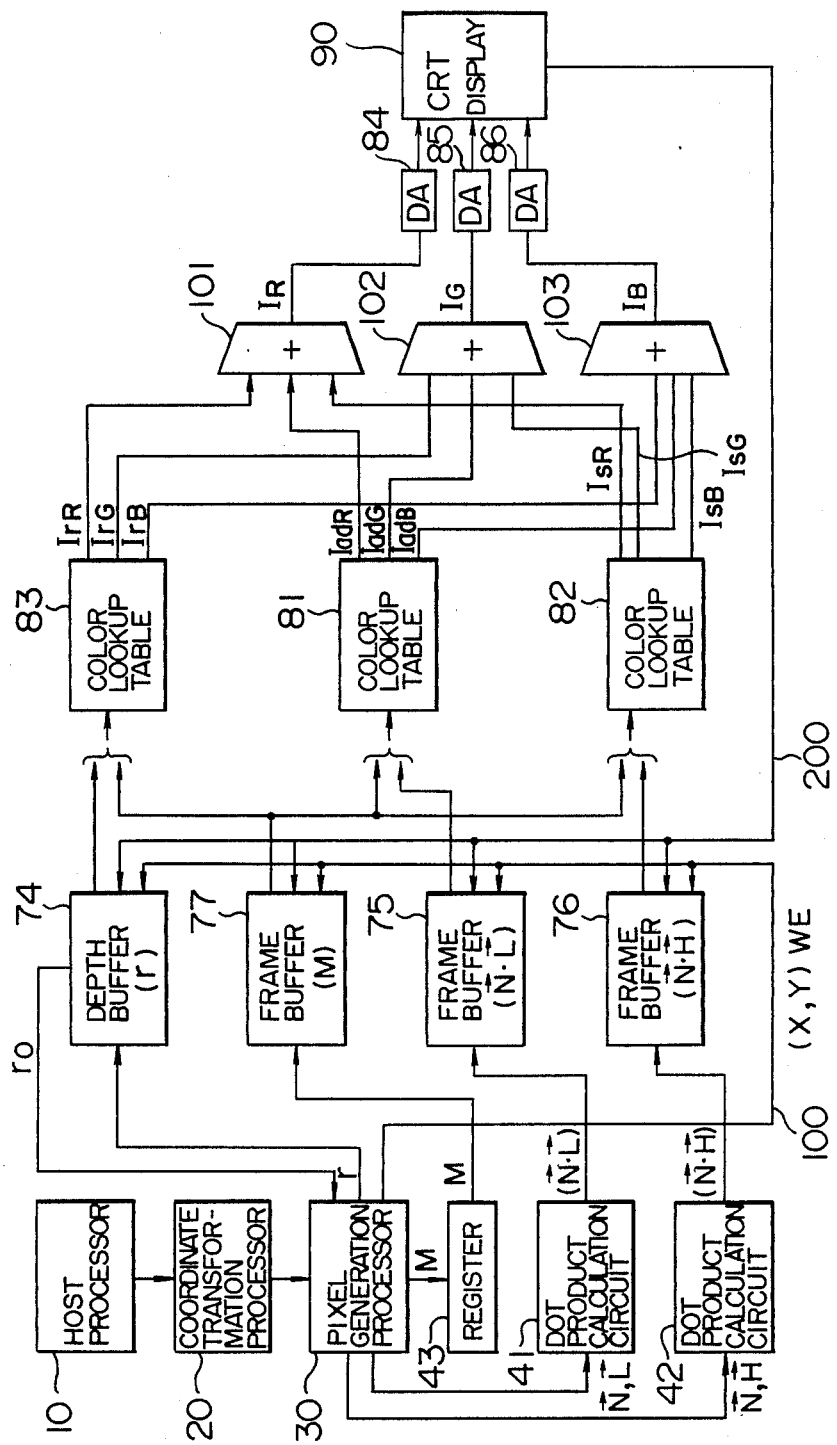
FIG. 3 is a block diagram of a display device according to a second embodiment of this invention.

Referring now to FIG. 3 which shows an entire display system according to a second embodiment of this invention, the host processor 10, coordinate transformation processor 20, pixel generation processor 30, dot calculation circuits 41 and 42, register 43, depth buffer 74, digital-to-analog converters 84 to 86 and CRT display 90 are those which were employed in the first embodiment as shown in FIG. 1. In FIG. 3 are newly provided frame buffers 75 to 77 for storing the dot products ($\vec{N}\cdot\vec{L}$) and ($\vec{N}\cdot\vec{H}$) and material number M, respectively, which have the storing area corresponding to each of the pixels to be displayed on the CRT display device 90. The dot product calculation circuits 41 and 42, as in FIG. 1, calculate the dot products and ($\vec{N}\cdot\vec{H}$) for each of the pixels for displaying a graphic, respectively. The dot products ($\vec{N}\cdot\vec{L}$) and ($\vec{N}\cdot\vec{H}$) from the circuits 41 and 42 and the material number M from the register 43 are stored in the frame buffers 75 to 77, respectively, in accordance with the address (x, y) and write enable signal WE which are sent from the pixel generation processor 30. The contents of the frame buffers 75 to 77 and depth buffer 74 are read out in synchronism with the address 200 sent from the CRT display device 90. A color lookup table 83 previously stores the reflection light intensity data $I_{rR}$, $I_{rG}$ and $I_{rB}$ together, held in the reflection light intensity tables 57, 58 and 59 in FIG. 1, respectively, at the storing position corresponding to a combination of the depth value r and material number M. A color lookup table 81 previously stores the reflection light intensity data $I_{adR}$, $I_{adG}$ and $I_{adB}$ together, held in the reflection light intensity tables 51, 52 and 53 in FIG. 1, respectively, at the storing position corresponding to a combination of the dot product ($\vec{N}\cdot\vec{L}$) and material number M. A color lookup table 82 previously stores the reflection light intensity data $I_{sR}$, $I_{sG}$ and $I_{sB}$ together, held in the reflection light intensity tables 54, 55 and 56 in FIG. 1, respectively, at the storing position corresponding to a combination of the dot product ($\vec{N}\cdot\vec{H}$) and material number M. As mentioned above, when the depth buffer 74 and frame buffers 75 to 77 are accessed in synchronism with the scanning in the CRT display device 90, the depth r, dot products ($\vec{N}\cdot\vec{L}$) and ($\vec{N}\cdot\vec{H}$) and material number M for the pixel at the scanning position on the CRT display device 90 are read out therefrom. Then, to the color lookup table 83 is sent the address consisting of the depth r and material number M, and the corresponding reflection light intensity data $I_{rR}$, $I_{rG}$ and $I_{rB}$ are read out therefrom to adders 101, 102 and 103, respectively. Similarly, to the color lookup table 81 is sent the address consisting of the dot product ($\vec{N} \cdot \vec{L}$) and material number M and the corresponding reflection light intensity data $I_{adR}$, $I_{adG}$ and $I_{ddB}$ are read out therefrom to the adders 101, 102 and 103, respectively. Further similarly, to the color lookup table 83 is sent the address consisting of the dot product ($\vec{N}\cdot\vec{H}$) and material number M, and the corresponding reflection light intensity data $I_{sR}$, $I_{sG}$ and $I_{sB}$ are read out therefrom to the adders 101, 102 and 103, respectively. The adders 101, 102 and 103 add the reflection light intensity data sent there to produce the complete reflection light intensity data $I_R$, $I_G$ and $I_B$, i.e. the R, G and B component of the reflection light intensity I, and send them to the CRT display device 90 via D/A converters 84, 85, and 86.

In this way, this embodiment can provide substantially the same effect as in the first embodiment shown in FIG. 1.

Figure 4:
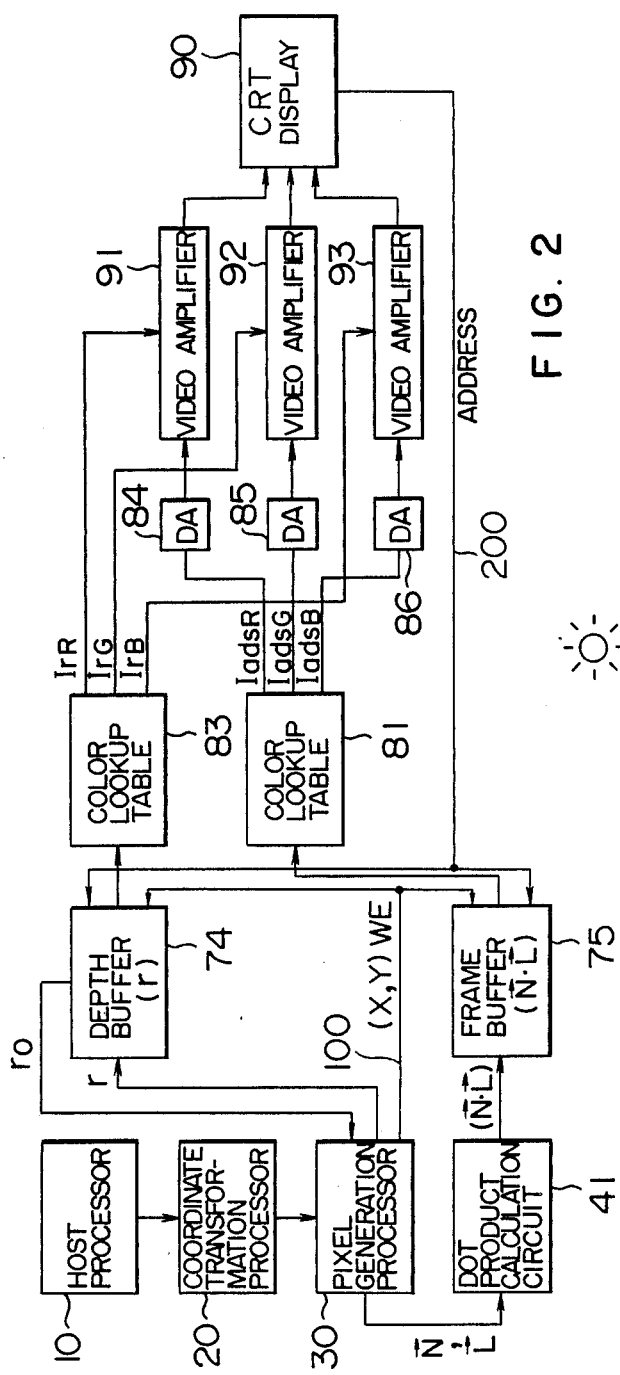
FIG. 4 is a block diagram of a display system according to a third embodiment of this invention.

Referring now to FIG. 4 showing a third embodiment of this invention, components 10, 20, 30, 41, 74, 75, 84 to 86 and 90 are those which are shown in FIG. 3. In this embodiment, the frame buffers 76, 77, color lookup table 82, and adders 101 to 103, shown in FIG. 3, are omitted. Since the frame buffer 76 is omitted, only the dot product ($\vec{N}\cdot\vec{L}$) and depth value r are supplied to color lookup tables 81 and 83, respectively. In this embodiment, the frame buffer 77 as shown in FIG. 3 is omitted since in this embodiment plural graphics to be simultaneously displayed are assumed to be the same in their material. But this is not important (this buffer 77 may be provided in this embodiment as required).

Figure 2:
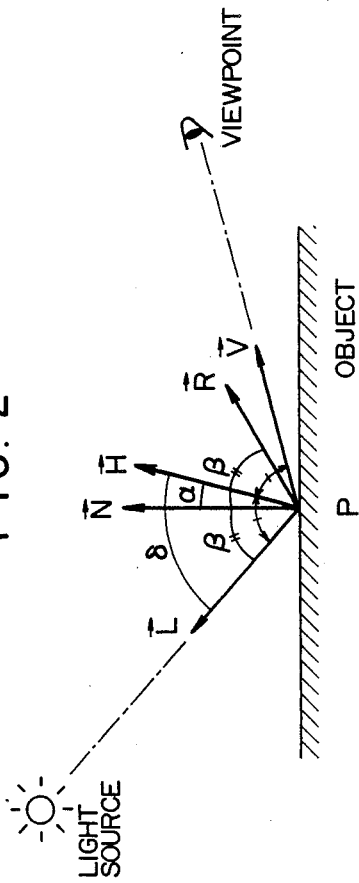
FIG. 2 is a view showing several vectors used to calculate the reflecting intensity of a three-dimensional object.

One important thing in this embodiment is that the memory contents of the color lookup table 81 are made different from that in the case of FIG. 3 in compensation of the omission of the frame buffer 76 as shown in FIG. 3. The specular reflection light component defined by Equation (11) is significant only when the dot product ($\vec{N}\cdot\vec{H}$) is close to 1, that is, only in the range where the angle $\alpha$ as shown in FIG. 2 formed by the normalized normal vector $\vec{N}$ and the normalized vector $\vec{H}$ in the middle direction between the light source and the viewpoint is O or close to O. Assuming that the angle formed by the normalized vector $\vec{L}$ in the direction of a light source and $\vec{N}$ is $\beta$, and the angle formed by $\vec{L}$ and $\vec{H}$ is $\delta$, $\alpha=\delta-\beta$. Also, $\cos\alpha=(\vec{N}\cdot\vec{H})$ and cos $\beta = (\vec{N} \cdot \vec{L})$. Therefore, if the light source and viewpoint are fixed, $\delta$ is constant. Thus, the specular reflection light component is significant for $(\vec{N} \cdot \vec{L})$ in a certain range where $\delta$ is close to $\beta$. For the reason mentioned above, the value obtained by adding Equation (10) and Equation (11), $I_{ads}$, is previously stored for the dot product $(\vec{N} \cdot \vec{L})$ in the above range in the color lookup table 81 as shown in FIG. 4. Therefore, the same reflection light intensity data influenced by the specular reflection light component as in the presence of 76 and 82 of FIG. 3 can be provided. The outputs from the color lookup table 81, $I_{adsR}$, $I_{adsG}$ and $I_{adsB}$ are the R, G and B component of the reflection light intensity I, thus obtained.

Another important thing in this embodiment is that the adders for adding the outputs from the color lookup tables 81 and 83 are not employed, and in lieu of these adders, the outputs from the color lookup table 81, $I_{adsR}$, $I_{adsG}$ and $I_{adsB}$ are converted into analog video signals by D-A converters 84, 85 and 86, and are amplified by video amplifiers 91, 92 and 93 in accordance with the values of the outputs $I_{rR}$, $I_{rG}$ and $I_{rB}$ from the color lookup table 83. Thus, the reflection light intensity of the video signal sent to the CRT display device 90 depends upon both the outputs from the color lookup tables 81 and 83 and hence upon the depth value r and dot products $(\vec{N} \cdot \vec{L})$ and $(\vec{N} \cdot \vec{H})$. In this case, the reflection light intensity I of the video signal is not the sum of the reflection light intensity $I_r$ depending upon the depth value r (Equation (7)) and the reflection light intensity $I_N$ depending upon the vector $\vec{N}$, but depends upon the product of both. It should be understood, however, that this embodiment can also provide substantially the same display image as that obtained in the first and second embodiments as shown in FIGS. 1 and 3. This embodiment can be implemented by a more simplified circuit since the frame buffer 76 and adders 101 to 103, shown in FIG. 3, can be omitted. Since the adders 101 and 103, shown in FIG. 3, which must take a sufficiently short signal delay time, are not required in this embodiment, this embodiment can provide a great merit in actual uses.

We claim:

1. A display system for displaying a two-dimensional graphic obtained when a three-dimensional graphic to be displayed is projected on a two-dimensional screen, said display system comprising:
   display means including a scanned display screen having a plurality of display pixels thereon;
   first means for producing a depth value signal and a normal direction signal for each of those display pixels included in the two-dimensional graphic from among said plurality of display pixels, the depth value signal indicating the distance from a predetermined hypothetical viewing point to the point on the three-dimensional graphic corresponding to the position of each display pixel, the normal direction signal indicating the normal direction to the surface of the three-dimensional graphic at said corresponding point for each display pixel;
   second means connected to said first means and responsive to each of the depth value signals for producing a first reflection light intensity signal for each display signal, the first reflection light intensity signal indicating the portion of the entire reflection light intensity at said corresponding point resulting from the depth value signal for each display pixel when said corresponding point is viewed from said hypothetical viewing point as the three dimensional graphic is illuminated by a hypothetical light source, said second means including:
   (a) first frame buffer means having a memory region corresponding to each display pixel of an image to be displayed on said display means, for storing the depth value signal for said corresponding point and outputting the stored depth value signal in synchronism with scanning of said display means, and
   (b) first-reflection-light control means connected to said first frame buffer means and responsive to a depth value signal from said first frame buffer means for producing a first reflection light intensity signal for the associated display pixel;
   third means connected to said first means and responsive to each of the normal direction signals for producing a second reflection light intensity signal for each display pixel, the second reflection light intensity signal indicating the portion of the entire reflection light intensity at said corresponding point resulting from the normal direction for each display pixel; and
   fourth means, connected to said display means, said second means and said third means and responsive to said first and second reflection light intensity signal for each display pixel for controlling a reflection light intensity signal to be sent to said display means for each of said plurality of display pixels;
   said first means including means connected to said first frame buffer means for producing a depth value signal associated with a point on the three-dimensional graphic to be displayed on said display means and determining whether the produced depth value signal represents a depth value smaller than the depth value represented by the depth value signal already stored in said first frame buffer means for the display pixel associated with the point to be displayed; and means for inhibiting display of the point when the determination is that the produced depth value signal represents a smaller depth value than that represented by the already stored depth value signal.

2. A display system, according to claim 1, wherein:
   said first-reflection-light control means comprises first color lookup table means connected to said first frame buffer means for storing the first reflection light intensity signal for each of the plurality of depth values and responsive to the depth value signal from said first frame buffer means for outputting the first reflection light intensity signal corresponding to the associated depth value; and
   said third means comprises:
   (a) a second frame buffer means having a memory region corresponding to each display pixel of an image to be displayed on said display means, for storing for each display pixel a dot product signal representative of the dot product of a normalized vector for the corresponding point and the vector in a predetermined direction from said viewing point and for outputting the stored dot product signal in synchronism with scanning of said display means;
   (b) means connected to said first means and responsive to the normal direction signal from said first means for calculating the dot product of the vector represented by said normal direction signal and the vector in the direction of the viewing point and supplying the calculated dot product to said second frame buffer means; and (c) second color lookup table means connected to said second frame buffer means for storing the second reflection light intensity signal for each of the plurality of dot products, and responsive to the dot product signal from said second frame buffer means for outputting the second reflection light intensity signal corresponding to the associated dot product.

3. A display system according to claim 2, wherein said fourth means comprises adding means connected to said first and second color lookup table means for adding the outputs therefrom and supplying the addition result to said display means as a reflection light intensity signal.

4. A display system according to claim 2, wherein said fourth means comprises means connected to said first and second color lookup table means for converting the output from said second color lookup table means into a video signal and amplifying said video signal with a gain dependent upon the output from said first color lookup table means.

* * * * *